(12) United States Patent
Moorman

(10) Patent No.: US 6,796,330 B1
(45) Date of Patent: Sep. 28, 2004

(54) PRESSURE CONTROL APPARATUS FOR A TORQUE-TRANSMITTING MECHANISM

(75) Inventor: Steven P. Moorman, Dexter, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/414,072

(22) Filed: Apr. 15, 2003

(51) Int. Cl.⁷ .............................................. F15B 13/043
(52) U.S. Cl. ............... 137/625.66; 91/433; 137/625.64; 192/109 F
(58) Field of Search ...................... 137/625.64, 625.66; 91/433; 192/109 F

(56) References Cited

U.S. PATENT DOCUMENTS 1,912,447 A * 6/1933 Gray ..................... 137/625.66
6,378,557 B2 * 4/2002 Kawamura et al. ...... 192/109 F \* cited by examiner

*Primary Examiner*—Gerald A. Michalsky
(74) *Attorney, Agent, or Firm*—Leslie C. Hodges

(57) ABSTRACT

A pressure control apparatus is disposed in a pressure control system for a transmission to set pressure control at a torque-transmitting mechanism. The pressure control apparatus includes a torque-transmitting mechanism control valve, which distributes pressure from a high pressure source to the torque-transmitting mechanism. Also within the pressure control apparatus is a boost valve mechanism, which is effective to control feedback pressure on the torque transmitting mechanism pressure regulator valve thereby controlling the pressure rise at the torque-transmitting mechanism and also permitting a boost pressure to be distributed to the torque-transmitting mechanism when full engagement thereof is required.

2 Claims, 3 Drawing Sheets

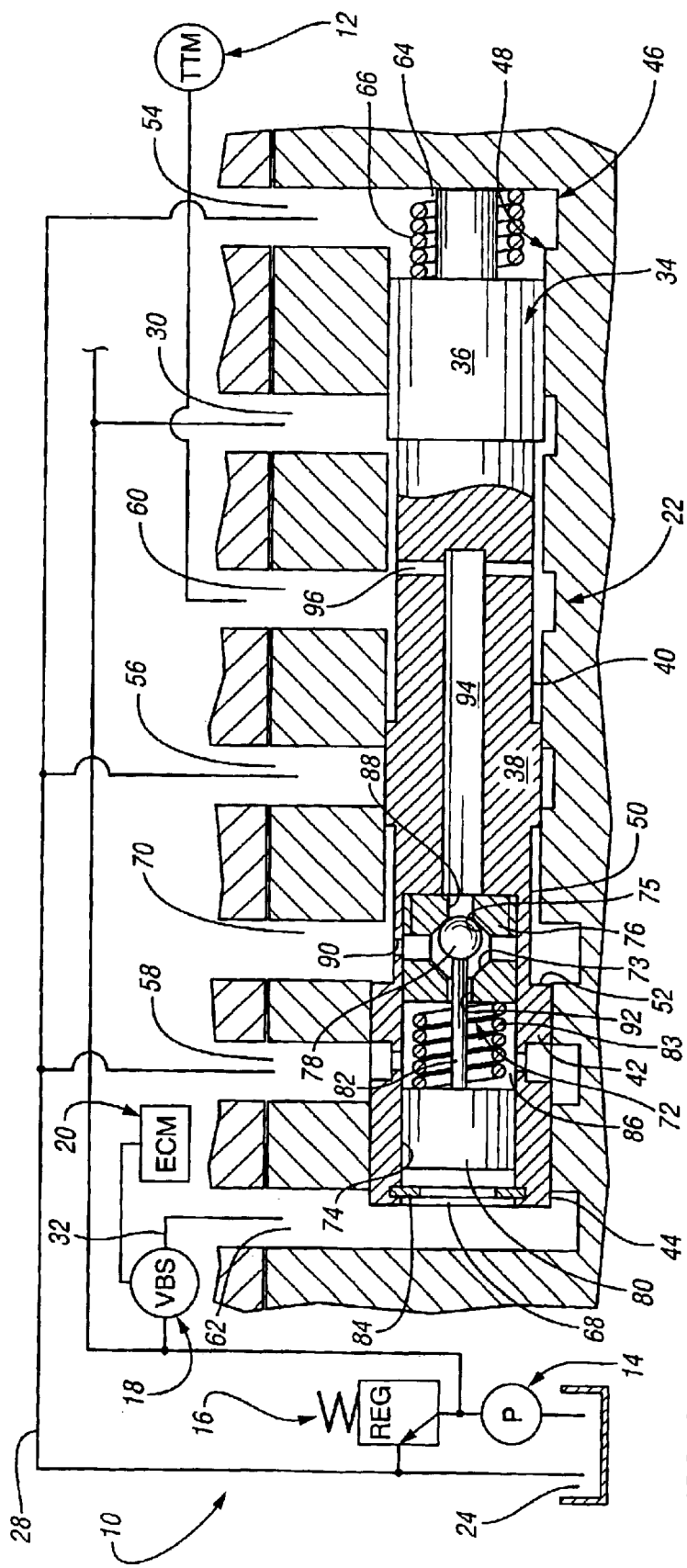
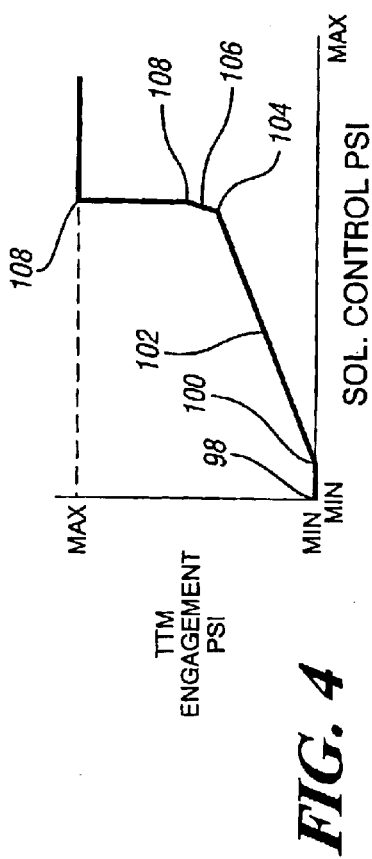
FIG. 3
FIG. 4

PRESSURE CONTROL APPARATUS FOR A TORQUE-TRANSMITTING MECHANISM

TECHNICAL FIELD

This invention relates to pressure control apparatus and, more particularly, to pressure control apparatus including a pressure control valve for a torque-transmitting mechanism.

BACKGROUND OF THE INVENTION

Automatic shifting power transmissions include a plurality of torque-transmitting mechanisms such as friction clutches and brakes. These clutches and brakes are generally fluid-operated mechanisms, which require a fluid pressure control to complete engagement and disengagement of the torque-transmitting mechanism. These mechanisms and their structure are well known in the art, as are many pressure controls for establishing the engagement and disengagement of the torque-transmitting mechanism.

In many of the current transmissions, it is desirable to control the engagement pressure of a torque-transmitting mechanism at an increasing rate or a ramp rate during engagement of the torque-transmitting mechanism and to increase the pressure to a maximum value when the torque-transmitting mechanism has been fully engaged. The ramp control pressure is important in that it controls the frictional engagement at low levels during ratio interchanges when one torque-transmitting mechanism is being engaged and another is being disengaged.

Many of the prior art controls for torque-transmitting mechanisms incorporate variable gain valves wherein a first control rate is used during a portion of the engagement and a second control rate is used during the remainder of the control pressure engagement. Many of these valves incorporate differential areas formed on a valve spool to provide the different gain rates that are required for overall control of the friction device.

Also, many of the prior art control mechanisms employ a solenoid signal, which is controlled at pressure levels to provide the required gain at the torque-transmitting mechanism control member. These control signals or solenoids might be a variable bleed solenoid or a pulse-width-modulated solenoid, both of which are well known to those skilled in the art. These solenoid pressure controls are generally established by an electronic control module, which includes a programmable digital computer, which contains the necessary information for controlling the torque-transmitting mechanism pressure throughout a shift interchange or a ratio interchange as well as controlling the pressure after the interchange is completed. In many instances, the control pressure of the solenoid valve is utilized to provide the full range of torque-transmitting mechanism pressure required for both regulation during ratio interchanges and full engagement.

SUMMARY OF THE INVENTION

It is an object of the present invention to provide an improved pressure control apparatus for a torque-transmitting mechanism.

In one aspect of the present invention, the pressure control apparatus includes a valve spool slidably disposed in a valve bore and operable to provide control pressure to a torque-transmitting mechanism.

In another aspect of the present invention, the valve spool is operable to distribute a system pressure to the torque-transmitting mechanism as well as to a feedback area on the valve spool to control the gain or the pressure rise at the torque-transmitting mechanism.

In still another aspect of the present invention, the spool valve is controlled by a variable pressure signal from a solenoid source and the feedback pressure is operable to counteract a portion of the control signal thereby controlling the rate of pressure rise at the torque-transmitting mechanism.

In yet still another aspect of the present invention, a boost valve is incorporated internally of the spool valve to provide for a high pressure output to the torque-transmitting mechanism.

In a further aspect of the present invention, the opening and closing of the boost valve is controlled by the variable pressure signal from the solenoid valve, such that when the solenoid valve reaches a maximum or a predetermined pressure, the boost valve is operable.

In a yet further aspect of the present invention, the boost valve when in an operable position decreases or eliminates the feedback pressure on the valve spool thereby causing a maximum output pressure for the torque-transmitting mechanism.

In a still further aspect of the present invention, the boost valve incorporates a ball valve, which is responsive to the variable solenoid pressure to permit fluid flow to the feedback differential area when the boost is not required and to exhaust the feedback area when boost is required.

DESCRIPTION OF THE DRAWINGS

FIG. 3 is a view similar to FIGS. 1 and 2, wherein the control valve is shown in a boost position.

FIG. 4 is a graph describing the relationship between solenoid control pressure and torque-transmitting engagement pressure.

DESCRIPTION OF AN EXEMPLARY EMBODIMENT

Figure 1:
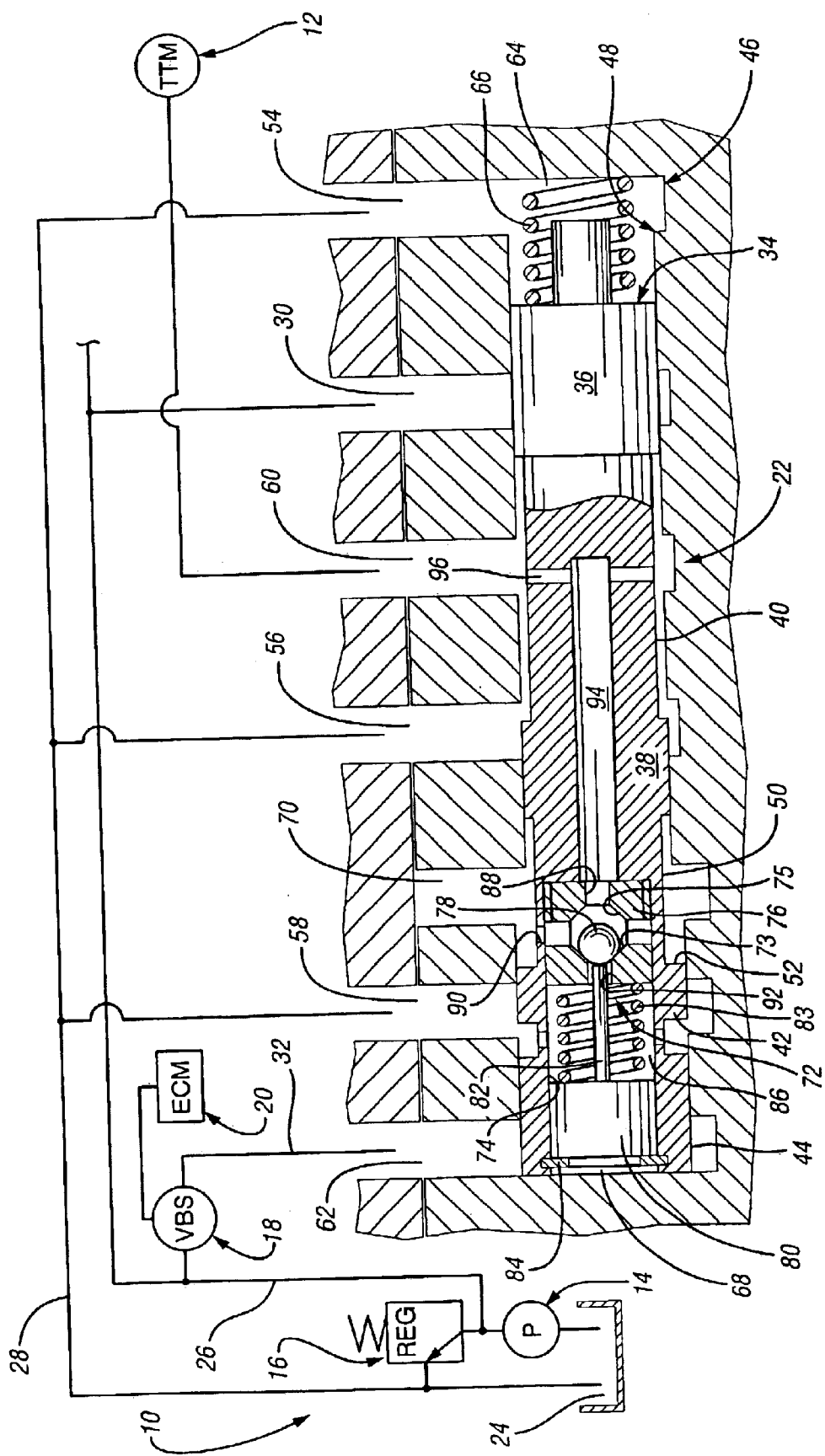
FIG. 1 is a schematic and diagrammatic representation of a control mechanism having a control valve incorporating the present invention.
Figure 2:
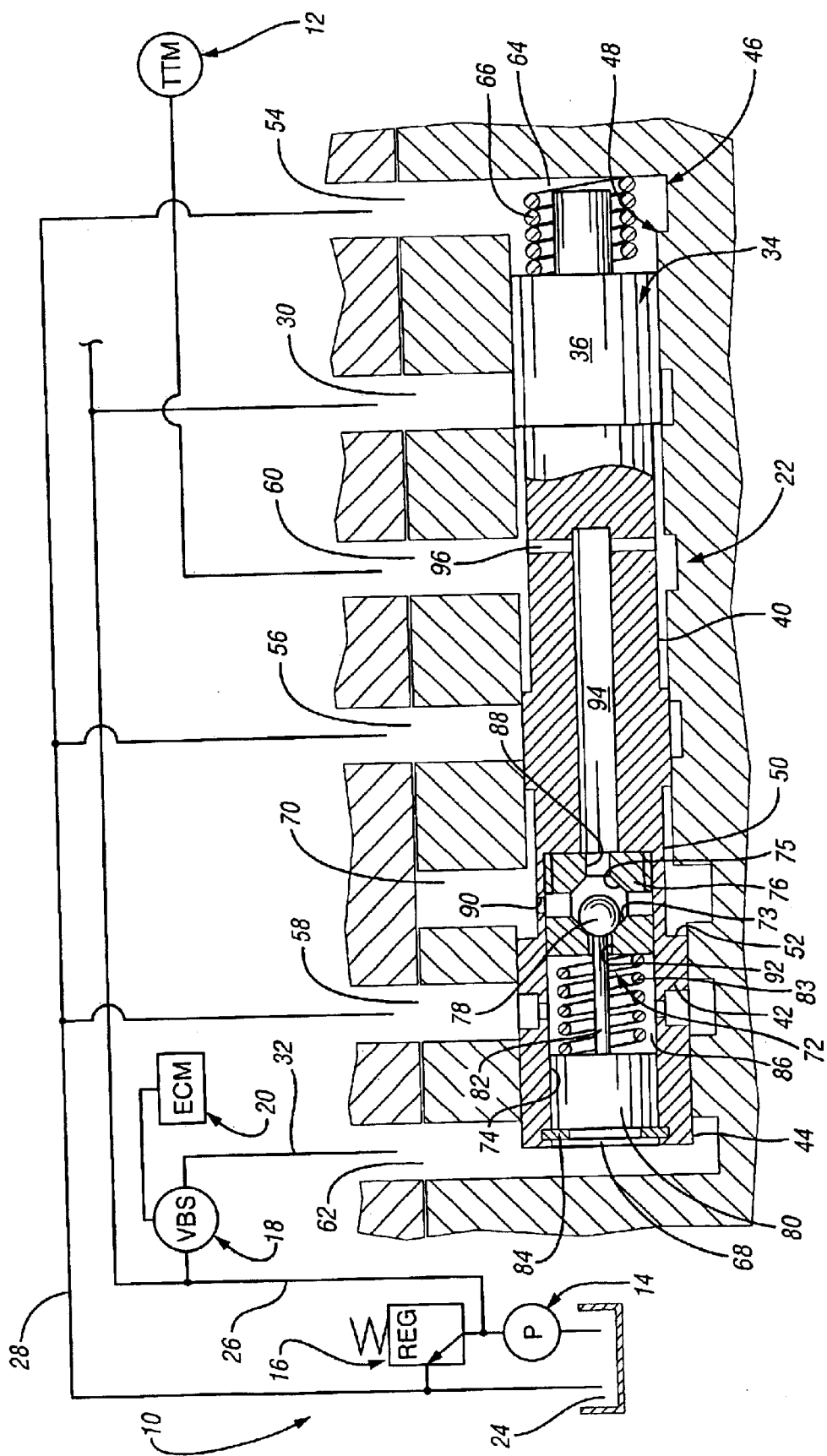
FIG. 2 is a view similar to FIG. 1, wherein the control valve mechanism is shown in a regulating position.

Referring to the drawings, wherein like characters represent the same or corresponding parts throughout the several views, there is seen in FIGS. 1, 2, and 3 a portion of a hydraulic control 10 for controlling the engagement and disengagement of a conventional torque-transmitting mechanism 12. The torque-transmitting mechanism 12 is a conventional fluid-operated friction device having an engagement piston and a plurality of friction discs disposed between two members of a power transmission, such as a shaft and a gear or a gear and a housing.

The control 10 includes a positive displacement pump 14, a pressure regulator valve 16, a variable bleed solenoid (VBS) 18, an electronic control module (ECM) 20, and a torque-transmitting pressure regulator valve 22. The pump 14 might be either a gear pump or a ring type pump, which drives fluid from a reservoir 24 for delivery to a main pressure or line pressure passage 26. The regulator valve 16 is a conventional pressure regulator valve, which limits the pressure within passage 26 to a predetermined value in a well known manner. The pressure regulator valve 16 is operative to direct excess fluid from the pump 14 to an exhaust passage 28, which returns fluid to the reservoir 24.

The passage 26 is fluid communication with the variable bleed solenoid 18 for delivery of fluid thereto and also in fluid communication with an inlet port 30 of the valve 22. The passage 26 extends to other components of the transmission, which includes other torque-transmitting mechanisms and other control valve mechanisms.

The variable bleed solenoid 18 is a conventional electronically controlled valve mechanism, which provides an output signal at passage 32 proportional to the control signal given to the VBS 18. The electronic portion of the VBS 18 is controlled by the electronic control module 20, which includes a conventional preprogrammable digital computer. These control devices are well known in the art of transmission controls.

The torque-transmitting pressure regulator valve 22 includes a valve spool 34 having two equal diameter lands 36 and 38 and a valley 40 between the lands. The valve spool 34 also has two large diameter lands 42 and 44. The valve spool 34 is slidably disposed in a valve body 46, which has a valve bore 48 having diametral portions complementary to the valve lands 36, 38, 42, and 44. The valve land 42, which is spaced from the valve land 38 by a valley 50, cooperates therewith to form a differential control area 52.

The valve body 46 includes the inlet port 30; three exhaust ports 54, 56, and 58; a torque-transmitting mechanism regulator port 60; and a VBS control port 62. The valve spool 34 cooperates with the valve bore 48 to form a spring chamber 64 in which is disposed a return spring 66. The return spring 66 urges the valve spool 34 leftward in the valve bore 48, as viewed in FIGS. 1, 2, and 3. The valve land 44 and the valve bore 48 cooperate to form a control chamber 68, which communicates with the VBS control port 62. The chamber 64 communicates with the exhaust passage 54 thereby preventing any pressure buildup in that area.

The torque-transmitting mechanism regulator port 60 communicates with the valve bore 48 between the lands 36 and 38. The valve body 46 also has a feedback area or port 70, which communicates with the differential control area 52.

A boost valve assembly 72 is disposed in a bore 74 formed in the valve spool 34. The boost valve assembly 72 includes a body portion 76, having two conical valve seats 73, 75, a ball 78, and a control piston 80 having a stem 82, which extends into the body portion 76 to affect movement of the ball 78. The ball 78 is adapted to seat against the conical valve seats 73, 75. The control piston 80 is urged to separate from the body 76 by a boost spring 83. The boost spring 83 urges the piston 80 leftward against a conventional locking or locating ring 84. As seen in FIG. 1, the ball 78 is seated against the valve seat 73.

A chamber 86 surrounding the spring 83 is connected continuously with the exhaust port 58. Thus, pressure buildup in the chamber 86 will not occur. The body 76 has an inlet port 88, a plurality of outlet ports 90, and an exhaust port 92. The inlet port 88 communicates with an axially extending passage or central passage 94 formed in the valve spool 34. The passage 94 is communicated with the torque-transmitting mechanism regulator port 60 through a plurality of radial passages 96. Thus, the torque-transmitting regulated pressure operates in the passage 94. The exhaust port 92 communicates with the chamber 86 and therefore exhaust port 58. The ball 78 is urged toward the valve seat 73 by torque transmitting mechanism engagement fluid pressure in the passage 94.

In the position shown in FIG. 1, which is the exhaust position for the torque-transmitting mechanism 12, the valve land 36 closes the inlet port 30 and the valve land 38 opens the torque-transmitting mechanism regulator port 60 to the exhaust port 56. The pressure within the chamber 68 is essentially zero or a minimum valve, as shown in FIG. 4, at point 98, as the torque-transmitting mechanism 12 is fully exhausted through the port 60 and port 56.

When it is desired to engage the torque-transmitting mechanism 12, the pressure in chamber 68, which is controlled by the VBS 18, is increased beyond the point 100 of FIG. 4. As the pressure within the chamber 68 increases, the valve spool 34 will be urged rightward against the return spring 66. This movement will continue until the valve land 36 provides communication between the port 30 and the torque-transmitting mechanism regulator port 60. At essentially the same time, the exhaust port 56 is closed by the land 38. This will permit an increase in fluid pressure at the torque-transmitting mechanism 12.

The pressure at the torque-transmitting mechanism 12 is also communicated through the passage 94 and the port 88 to the differential control area 52. This will provide a counterforce for the pressure in control chamber 68 such that as the pressure from the VBS 18 increases, the pressure at the torque-transmitting mechanism 12 will increase along the line 102, shown in FIG. 4.

As is well known with feedback valve systems, when the pressure in chamber 68 increases, the pressure at port 60 will increase as will the pressure in the differential control area 52, thus creating the gain curve or pressure curve shown in FIG. 4 at line 102. When the pressure in chamber 68, as provided by the VBS 18, reaches the point 104 at FIG. 4, the control piston 80 will be moved against the spring 83 thereby moving the ball 78 away from the exhaust port 92 and onto the inlet port 88. This will cause the pressure at the torque-transmitting mechanism 12 to rise along the line 106 until the ball 78 is fully seated against the inlet port 88 at point 108.

As the ball 78 is moved from the exhaust port 92 toward the inlet port 88, the pressure in the differential control area 52 will begin to decrease, which will permit an increase in the pressure at the torque-transmitting mechanism 12. When the ball 78 is fully seated against the inlet port 88 as shown in FIG. 3, the pressure at the torque-transmitting mechanism 12 will increase to the point 108, which is substantially equal to the pressure in the main line passage 26. This is the maximum pressure within the system and the torque-transmitting mechanism 12 will be engaged with this maximum pressure when required by the shift controls and the ECM 20. As the control pressure in passage 68 increases, the actuator assembly 79 will displace the ball 78 from the seat 73 to reduce the pressure at the differential area 52 thereby increasing the engagement pressure in the port 60.

As seen in FIG. 3, the ball 78 is fully seated on the valve seat 75 against the inlet port 88 thereby creating an exhaust passage through the body portion 76 to fully exhaust the differential area 52 to the exhaust port 58. Also, it will be noted in FIG. 3 that the land 38 fully closes the exhaust port 56 while the land 36 fully opens the port 30 thereby opening port 60 to the line pressure in passage 26.

When it is desired to disengage the torque-transmitting mechanism 12, the pressure in chamber 68 will be decreased by the VBS 18 until the torque-transmitting control pressure at port 60 reaches the point 104. After this occurrence, the outgoing torque-transmitting mechanism can be decreased along the schedule controlled by the ECM 20.

What is claimed is:

1. A pressure control apparatus for a torque-transmitting mechanism comprising:

a pressure source;

a control source;

a valve body including a valve bore communicating with both said pressure source and said control source;

a valve spool slidably disposed in said valve bore and including a differential area formed by said valve spool and said valve bore;

an outlet port connected between said valve bore and said torque-transmitting mechanism and directing an engagement pressure therebetween;

said valve spool being operative in response to pressure from said control source to control fluid pressure communicated between said pressure source and said torque-transmitting mechanism;

a boost valve disposed within said valve spool and being responsive to said control source to control fluid pressure distribution to said differential area to thereby control the engagement pressure levels at the torque-transmitting mechanism;

said boost valve comprising a body portion, a pair of valve seats, a ball three port means, and an actuator means;

said being urged onto one of said valve seats by fluid pressure at said outlet port to open communication between a first and second of said port means and being urged toward said other of said valve seats by said actuator means in response to said control pressure to open communication between said second port means and said third port means, said second port means being in fluid communication with said differential area.

2. The pressure control apparatus for a torque-transmitting mechanism defined in claim 1 further wherein;

said actuator means comprises a control piston, a rod, and a spring means;

said rod passing through said one valve seat, and said second port means and said spring means urging said piston and said rod in a direction to permit said ball to seat on said one valve seat; and said control pressure urging said piston and said rod to move said ball toward said other valve seat when said control pressure is sufficient to overcome a force in said spring means.

\* \* \* \* \*